US009429065B2

(12) United States Patent
Zoeller et al.

(10) Patent No.: US 9,429,065 B2
(45) Date of Patent: Aug. 30, 2016

(54) INTERNAL COMBUSTION ENGINE

(75) Inventors: Herbert Zoeller, Stuttgart (DE);
Thomas Koch, Pfinztal-Berghausen (DE); Bernd Lamparter, Kirchheim/Teck-Nabern (DE); Christian Krauser, Waiblingen (DE)

(73) Assignee: Daimler AG, Stuttgart (DE)

( * ) Notice: Subject to any disclaimer, the term of this patent is extended or adjusted under 35 U.S.C. 154(b) by 446 days.

(21) Appl. No.: 14/112,594

(22) PCT Filed: Dec. 15, 2011

(86) PCT No.: PCT/EP2011/006335
§ 371 (c)(1),
(2), (4) Date: Oct. 18, 2013

(87) PCT Pub. No.: WO2012/143032
PCT Pub. Date: Oct. 26, 2012

(65) Prior Publication Data
US 2014/0048036 A1    Feb. 20, 2014

(30) Foreign Application Priority Data

Apr. 19, 2011   (DE) .......................... 10 2011 017 479

(51) Int. Cl.
*F02B 23/06*   (2006.01)
*F02B 23/10*   (2006.01)
(Continued)

(52) U.S. Cl.
CPC ......... *F02B 17/005* (2013.01); *F02B 23/0624* (2013.01); *F02B 23/0651* (2013.01);
(Continued)

(58) Field of Classification Search
CPC ............ F02B 23/0651; F02B 23/0669; F02B 23/0693; F02B 23/0696; F02B 23/0624; F02B 23/0627; F02B 23/0678; F02B 23/0687; F02B 23/101; F02M 61/1813; F02M 61/182; F02M 61/1826; F02M 61/1806; F02M 61/1833; F02M 2700/4376

USPC .................................. 123/279, 262, 305, 304
See application file for complete search history.

(56) References Cited

U.S. PATENT DOCUMENTS 2,620,781 A * 12/1952 Petersen ............... F02B 23/066
123/276
2,709,992 A *  6/1955 Graves ...................... F02B 3/00
123/193.1
(Continued)

FOREIGN PATENT DOCUMENTS

CN          1615399 A      5/2005
CN          1802492 A      7/2006
(Continued)

OTHER PUBLICATIONS

Office Action dated Oct. 21, 2014, in Japanese Application No. 2014-505515 (with English language translation).
(Continued)

*Primary Examiner* — Lindsay Low
*Assistant Examiner* — George Jin
(74) *Attorney, Agent, or Firm* — Patent Central LLC; Stephan A. Pendorf

(57) ABSTRACT

An internal combustion engine (1), preferably for a motor vehicle, having at least one cylinder (2) which encloses a combustion chamber (3) and in which a piston (4) is situated in such a way that it may perform a stroke movement, and having at least one injector (5) per cylinder for injecting fuel into the combustion chamber (3). The respective injector (5) has multiple injection openings (9, 10) through which the fuel exits from the injector (5) and enters into the combustion chamber (3).
To be able to react more fuel, first injection openings (9) and second injection openings (10) are situated relative to one another in such a way that first injection jets (15) from the first injection openings (9) reach the piston (4) essentially without contacting second injection jets (18) from the second injection openings (10).

10 Claims, 2 Drawing Sheets

Figure 1:
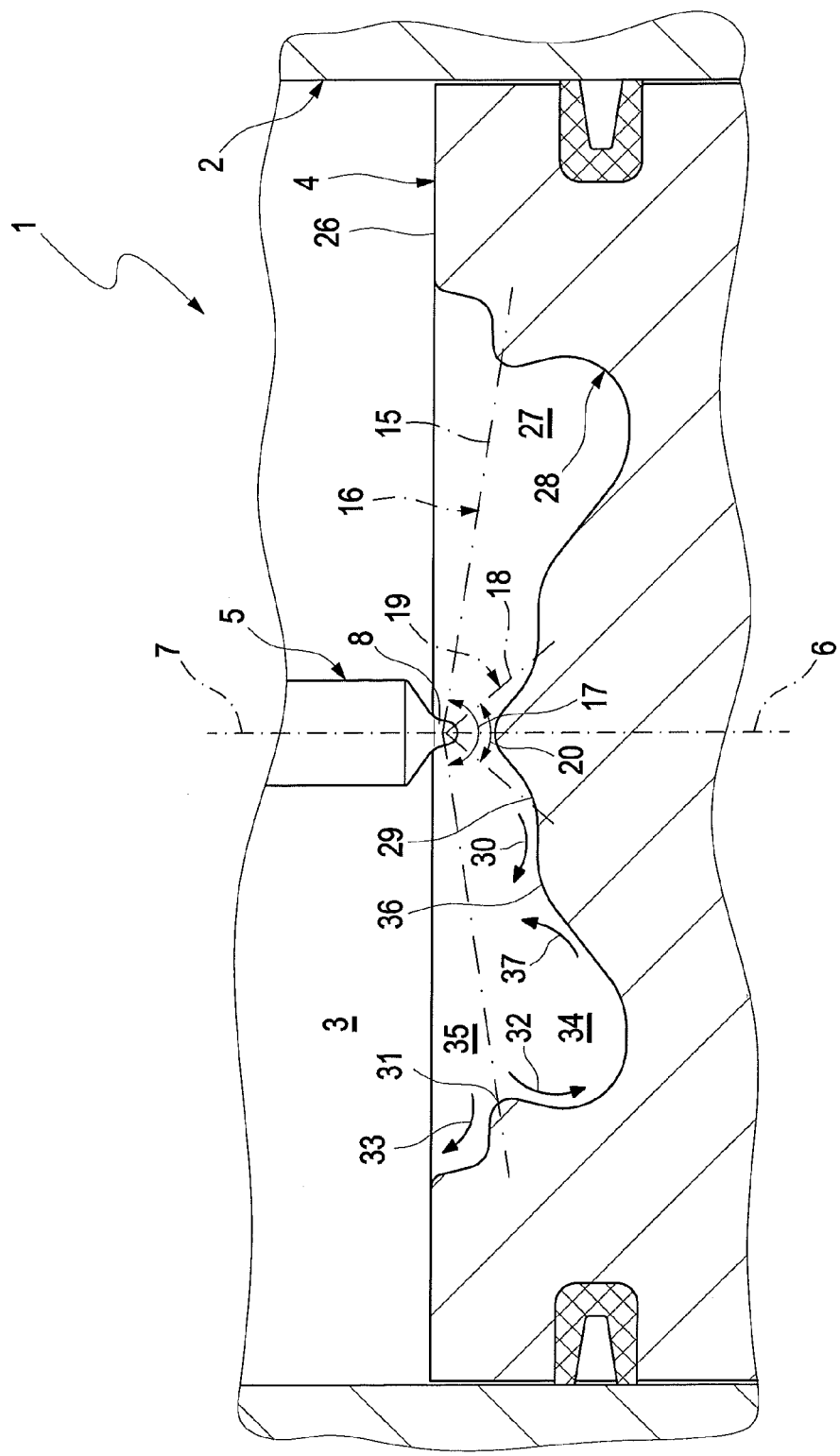

(51) Int. Cl.
*F02B 17/00* (2006.01)
*F02M 61/18* (2006.01)

(52) U.S. Cl.
CPC ....... *F02B23/0669* (2013.01); *F02B 23/0693* (2013.01); *F02B 23/0696* (2013.01); *F02M 61/182* (2013.01); *F02M 61/1813* (2013.01); *F02M 61/1826* (2013.01); *F02B 23/0627* (2013.01); *F02B 2023/103* (2013.01); *F02B 2275/14* (2013.01); *Y02T 10/123* (2013.01); *Y02T 10/125* (2013.01)

(56) References Cited

U.S. PATENT DOCUMENTS

| | | | | | |
|---|---|---|---|---|---|
| 2,851,019 | A * | 9/1958 | Fleming | ............ | F02B 23/0627 123/262 |
| 3,892,221 | A * | 7/1975 | Kimbara | ............ | F02B 23/0624 123/263 |
| 4,221,190 | A * | 9/1980 | Komiyama | ......... | F02B 23/0651 123/263 |
| 4,721,080 | A * | 1/1988 | Moriyasu | ................ | F02B 23/06 123/256 |
| 6,314,933 | B1 * | 11/2001 | Iijima | ................ | F02B 23/0696 123/193.6 |
| 7,210,448 | B2 * | 5/2007 | Stanton | ............... | F02B 23/0651 123/298 |
| 8,677,970 | B2 * | 3/2014 | Venugopal | .......... | F02B 23/0651 123/193.1 |
| 2004/0020457 | A1 * | 2/2004 | Regueiro | ............ | F02B 23/0669 123/276 |
| 2004/0237929 | A1 * | 12/2004 | Cavanagh | .......... | F02M 61/1826 123/299 |
| 2005/0120995 | A1 * | 6/2005 | Tsujimoto | ........... | F02B 23/0669 123/299 |
| 2006/0090726 | A1 * | 5/2006 | Meffert | ............... | F02B 23/0672 123/279 |
| 2006/0243242 | A1 * | 11/2006 | Blessing | ................... | F02B 1/12 123/299 |
| 2009/0025681 | A1 * | 1/2009 | Takahashi | ........... | F02B 23/0669 123/305 |
| 2010/0122686 | A1 * | 5/2010 | Kim | .................... | F02B 23/0651 123/298 |
| 2010/0258077 | A1 * | 10/2010 | Asai | .................... | F02B 23/0651 123/294 |
| 2013/0199498 | A1 * | 8/2013 | Gabel | ................. | F02B 23/0621 123/445 |
| 2014/0299105 | A1 * | 10/2014 | Hou | .................... | F02B 23/0669 123/478 |

FOREIGN PATENT DOCUMENTS

| | | |
|---|---|---|
| DE | 10245789 A1 | 4/2004 |
| EP | 1469193 A1 | 10/2004 |
| EP | 1676997 A1 | 7/2006 |
| EP | 2025919 A1 | 2/2009 |
| JP | 0571348 A | 3/1993 |
| JP | 571348 A | 3/1993 |
| JP | 2003214297 A | 7/2003 |
| JP | 4320403 B | 8/2009 |
| JP | 2010150982 A | 7/2010 |

OTHER PUBLICATIONS

English language translation of Chinese Office Action dated Mar. 30, 2015, in Chinese Application No. 201180070232.9.
Chinese Office Action (with English language translation) dated Dec. 21, 2015, in Chinese Application No. 201180070232.9.

* cited by examiner

INTERNAL COMBUSTION ENGINE

The present invention relates to an internal combustion engine, preferably for a motor vehicle, having the features of the preamble of claim 1. The invention further relates to an injector and a piston for this type of internal combustion engine, and a method for operating this type of internal combustion engine.

An internal combustion engine is known from EP 1 676 997 A1, having at least one cylinder which encloses a combustion chamber and in which a piston is situated in such a way that it may perform a stroke movement. In addition, an injector is associated with the cylinder, and is situated coaxially with respect to a longitudinal central axis of the cylinder and is used for injecting fuel into the combustion chamber. The injector used has multiple injection openings through which the fuel exits from the injector and enters into the combustion chamber during the particular injection process. The respective injector has a first opening row with multiple first injection openings in a first opening plane extending transversely with respect to the longitudinal central axis of the injector, and has a second opening row with multiple second injection openings in a second opening plane extending transversely with respect to the longitudinal central axis of the injector.

In the known internal combustion engine, the two opening planes are separated from one another by an axial distance, the second opening row being situated closer to an injector tip facing the piston. The first injection openings and the second injection openings generate differently oriented injection jets which result in different jet cones. The first jet cone generated by means of the first injection openings has a smaller jet cone angle than the jet cone generated by means of the second injection openings. Thus, in the known internal combustion engine the first and second injection openings are coordinated with one another with regard to number, positioning, and orientation in such a way that the first injection jets from the first injection openings necessarily collide with the second injection jets from the second injection openings, provided that an injection is carried out by both opening rows at the same time. The colliding injection jets form a shared jet cone which results in a shared flame front in the combustion chamber.

Another internal combustion engine is known from DE 102 45 789 A1, in which the injector is situated in a recess on the cylinder head side which delimits the combustion chamber with respect to the piston in the particular cylinder. A deflection geometry may be provided in this recess to deflect an incident injection jet.

For an internal combustion engine of the type mentioned at the outset, or for an associated operating method, or for an associated injector, or for an associated piston, the object of the present invention is to provide an improved embodiment which is characterized in particular by increased efficiency of the internal combustion engine.

This object is achieved according to the invention by the subject matter of the independent claims. Advantageous embodiments are the subject matter of the dependent claims.

The invention is based on the general concept of arranging the injection openings of the first opening row and the second opening row with respect to one another with regard to their number and/or position and/or orientation in such a way that in the case of a simultaneous fuel injection by the first injection openings and the second injection openings, first injection jets from the first injection openings reach the piston essentially without contacting second injection jets from the second injection openings. It is thus possible for corresponding separate flame fronts to arise in the combustion chamber, emanating from the separate injection jets or emanating from the separate jet cones. These flame fronts may spatially spread out in the combustion chamber and in particular move toward one another. Since multiple flame fronts thus exist in the combustion chamber at the same time, the air contained in the combustion chamber may be better utilized to be able to react more fuel overall. Since critical fuel concentrations in the combustion chamber may be largely avoided due to the separate injection jets and the separate flame fronts, each flame front has sufficient oxygen to achieve combustion that is low in pollutants, in particular low in soot. Coordination of the injection openings for achieving the separate injection jets on the one hand, and further injection parameters such as injection quantity and injection pressure on the other hand, are particularly advantageously selected in such a way that the flame fronts in the combustion chamber which spread out from the separate injection jets essentially do not make contact or collide. This means that at the point in time when the flame fronts of the two jet cones which are spreading out toward one another would meet, the respective injected fuel is reacted as completely as possible, and the respective flame is extinguished. It is thus ensured that the greatest possible quantity of oxygen is present for a reaction that is low in pollutants, in particular low in soot. More fuel per unit time or per ° CA (degrees crank angle) may thus be reacted overall, which increases the efficiency of the internal combustion engine.

According to one advantageous embodiment, a longitudinal central axis of the injector is situated essentially coaxially with respect to a longitudinal central axis of the cylinder.

The injector preferably has a shared nozzle needle for controlling the injection openings in the two opening planes, so that all injection openings are simultaneously controlled. In this case, injection always occurs through all injection openings, i.e., through the first injection openings as well as through the second injection openings. Alternatively, the injector may have two nozzle needles which in particular are situated coaxially one inside the other. The injection openings of the two opening rows may thus be controlled separately, so that, for example, an injection may be carried out in which the fuel is injected into the combustion chamber solely through the first injection openings. In addition, an injection may then also be carried out in which the fuel is injected into the combustion chamber through the first injection openings and also through the second injection openings. In principle, an embodiment is also conceivable in which a further injection is achievable which allows an injection of fuel solely through the second injection openings.

According to one advantageous embodiment, the first opening row may have 6 to 12, preferably 8 to 10, first injection openings. The second opening row may have 3 to 6, preferably 4 to 5, second injection openings.

One embodiment is particularly advantageous in which the first injection openings are configured for generating a first jet cone whose first jet cone angle is larger than a second jet cone angle of a second jet cone which may be generated by means of the second injection openings. In particular, the first jet cone angle may be at least 50% larger than the second jet cone angle. The first injection openings may advantageously be configured or oriented in such a way that their injection jets generate a jet cone having a first jet cone angle of 142° to 160°, preferably 146° to 156°, in particular approximately 150°. For the second injection openings, it may be provided that these are configured or oriented in such a way that their injection jets generate a second jet cone having a second jet cone angle of 50° to 120°, preferably 60° to 106°, in particular 60° to 90°.

According to another embodiment, the two opening planes may be separated from one another by an axial distance, the second opening plane being situated closer to an injector tip facing the piston than the first opening plane.

According to another advantageous embodiment, a fresh air supply to the internal combustion engine for the respective cylinder may be configured in such a way that the fresh air charge of the combustion chamber is acted on by a swirl, i.e., a rotation about the longitudinal central axis of the cylinder. In this type of swirl flow in the combustion chamber, the first injection openings and the second injection openings in the two opening planes are situated one on top of the other along the longitudinal central axis of the injector.

According to another embodiment, the second injection openings may be configured in such a way that they have a second jet disintegration which is greater than a first jet disintegration of the first injection openings. The jet disintegration is essentially determined by the respective opening diameter, by the conicity of the respective injection openings, and by the selected rounding of the respective injection openings on the inlet side and/or outlet side.

According to another embodiment, the particular piston may have a piston recess, on its side facing the respective combustion chamber, having a recess contour which for the second injection jets has a deflection geometry which deflects the second injection jets in the direction toward the first injection jets. A homogeneous spreading out of the fuel and of the combustion reaction in the combustion chamber may be assisted in this way.

In another embodiment, the particular piston may have a piston recess, on its side facing the respective combustion chamber, having a recess contour which for the first injection jets has a jet splitter geometry which splits the first injection jets into first and second partial jets, the first partial jets being deflected into an area facing the second injection jets, and the second partial jets being deflected into an area facing away from the second injection jets. This embodiment assists in the most homogeneous distribution possible of the fuel in the combustion chamber and the most uniform distribution possible of the combustion reaction.

According to one particular refinement, the recess contour may have a further deflection contour which deflects the first partial jets in the direction toward the first injection jets. This also assists in a homogenized fuel distribution and combustion process.

Thus, the invention further relates to an injector which has the two opening rows, the injection openings of which are configured in such a way that that during operation of the internal combustion engine the spreading injection jets do not meet, and that the flame fronts emanating from the injection jets essentially make no contact.

The invention further relates to a piston for this type of internal combustion engine, the side of the piston facing the combustion chamber having a piston recess which has a recess contour according to the above-described embodiments.

The invention further relates to a method for operating a direct-injection, auto-igniting internal combustion engine (gasoline engine or diesel engine), the first injection jets penetrating into the respective combustion chamber in the direction of the piston and generating a first flame front in the combustion chamber, and simultaneously with the first injection jets, second injection jets penetrating into the respective combustion chamber into the piston and generating a second flame front in the combustion chamber. The first injection jets and the second injection jets are now situated with respect to one another in such a way that they reach the piston essentially without contact. This is achieved in particular by the fact that the injection jets already do not collide with one another, and in particular the injection jets generate jet cones which are situated coaxially or concentrically with respect to one another and have various cone angles.

The injection of the fuel preferably takes place in the area of top dead center of the piston.

Further important features and advantages of the invention result from the subclaims, the drawings, and the associated description of the figures with reference to the drawings.

It is understood that the features stated above and to be explained below may be used not only in the particular stated combination, but also in other combinations or alone without departing from the scope of the present invention.

Preferred exemplary embodiments of the invention are illustrated in the drawings and explained in greater detail in the following description, wherein similar, identical, or functionally equivalent components are denoted by the same reference numerals.

Figure 2:
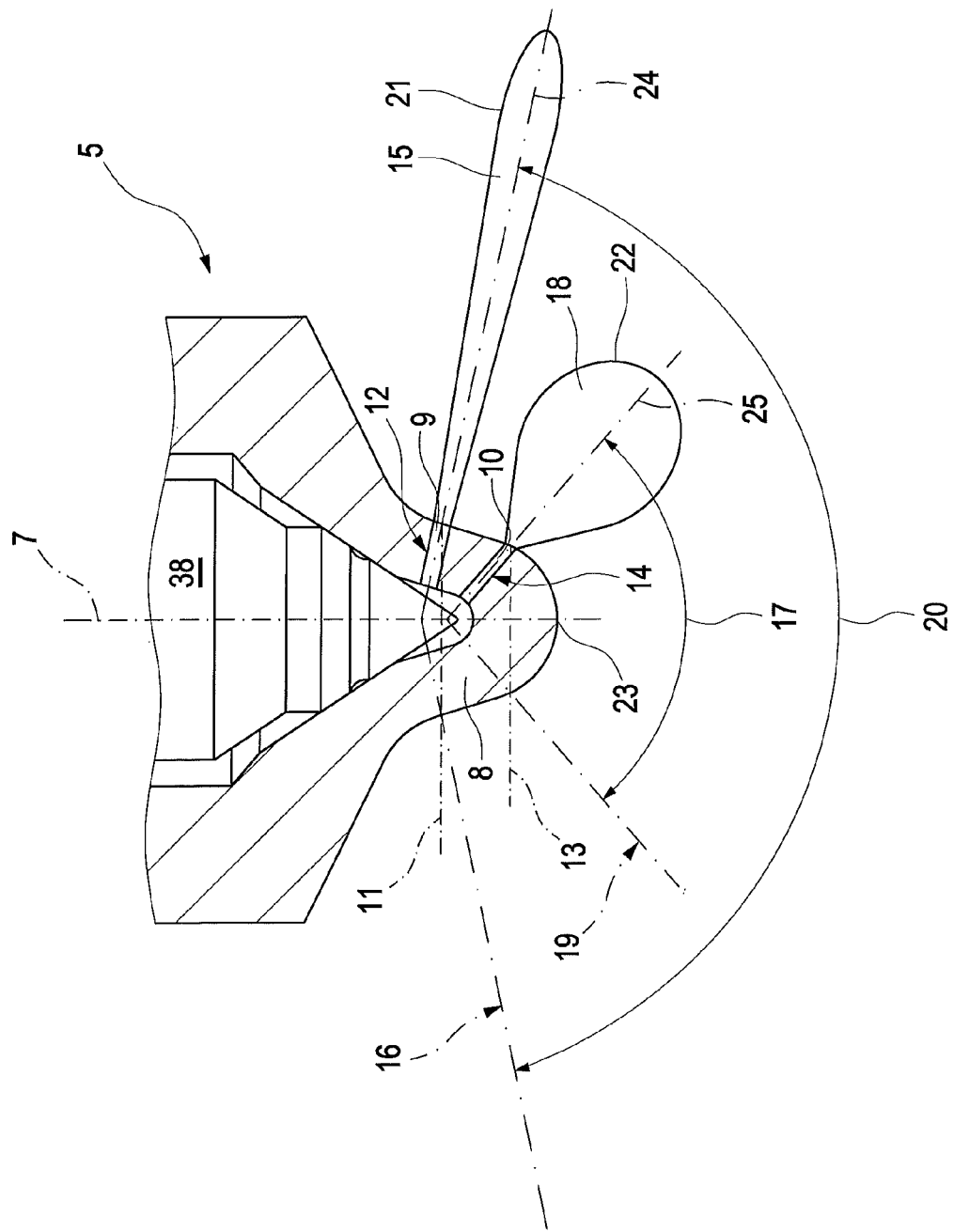

The drawings show the following, in each case schematically:

FIG. 1 shows a greatly simplified sectional illustration of an internal combustion engine in the area of a cylinder, and FIG. 2 shows a greatly simplified sectional view of an injector in the area of injection openings.

According to FIG. 1, an internal combustion engine 1, which in particular is used in a motor vehicle, has at least one cylinder 2 which encloses a combustion chamber 3 and in which a piston 4 is situated in such a way that it may perform a stroke movement. An injector 5 is associated with the respective cylinder 2, and fuel may be injected into the combustion chamber 3 by means of the injector. The injector 5 is situated essentially coaxially with respect to a longitudinal central axis 6 of the cylinder 2, so that a longitudinal central axis 7 of the injector 5 coincides with the longitudinal central axis 6 of the cylinder 2.

According to FIG. 2, the respective injector 5 has multiple injection openings 9, 10 in its end area 8 facing the piston 4, through which the fuel exits from the injector 5 and enters into the combustion chamber 3 during an injection process.

For this purpose, the injector 5 has a first opening plane 11 which extends transversely with respect to the longitudinal central axis 7 of the injector 5 and which lies in a first opening row 12 that is formed by multiple first injection openings 9 which are distributed in the peripheral direction along the end area 8 of the injector 5. In addition, the injector 5 has a second opening plane 13 which likewise extends transversely with respect to the longitudinal central axis 7 of the injector 5 and which lies in a second opening row 14 that is formed by multiple second injection openings 10, which for this purpose are distributed in the peripheral direction in the end area 8 of the injector 5.

For controlling the injection openings 9, 10 in the two opening planes 11, 13, the injector 5 preferably has a shared nozzle needle 38, so that all injection openings 9, 10 are simultaneously controlled. In this case, the injection always takes place through all injection openings 9, 10, i.e., through the first injection openings 9 as well as through the second injection openings 10. Alternatively, the injector 5 may have two nozzle needles, not illustrated, which in particular are situated coaxially one inside the other. The injection openings 9, 10 in the two opening rows may thus be controlled separately, so that, for example, an injection may be carried out in which the fuel is injected into the combustion chamber 3 solely through the first injection openings 9. In addition, an injection may then also be carried out in which the fuel is injected into the combustion chamber 3 through the first injection openings 9 and also through the second injection openings 10. In principle, an embodiment is also conceivable in which a further injection is achievable which allows an injection of fuel solely through the second injection openings 10.

During an injection process, the first injection openings 9 generate first injection jets 15 which form a first jet cone 16 having a first jet cone angle 17. In contrast, the second injection openings 10 generate second injection jets 18 which form a second jet cone 19 having a second jet cone angle 20. The first injection openings 9 and the second injection openings 10 are situated with respect to one another regarding their number and/or their position at the injector 5 and/or their orientation in such a way that the first injection jets 15 and the second injection jets 18 reach the piston 4 essentially without contacting one another. In particular for an auto-igniting internal combustion engine 1, i.e., preferably a diesel engine, in the case of auto-ignition, first flame fronts 21 spread out from the first injection jets 15 during the injection process, whereas second flame fronts 22 spread out from the second injection jets 18. The design and orientation of the injection jets 15, 18 is to be coordinated in conjunction with other injection parameters, for example injection quantity and injection pressure, in such a way that the flame fronts 21, 22 emanating from the injection jets 15, 18 essentially do not contact, or meet as late as possible. As a result, sufficient oxygen is always available for the reaction of the injected fuel, so that combustion that is as low as possible in pollutants, and preferably low in soot, is achievable.

The injector 5 advantageously has six to twelve first injection openings 9, preferably eight to ten first injection openings 9. In addition, the injector 5 advantageously has three to six second injection openings 10, preferably four to five second injection openings 10.

The injection openings 9, 10 are advantageously mounted or aligned on the injector 5 in such a way that the first jet cone angle 17 of the first jet cone 16 is larger than the second jet cone angle 20 of the second jet cone 19. In particular, the first jet cone angle 17 is at least 50% larger than the second jet cone angle 20. For example, the first jet cone angle 17 may be in a range of 142° to 160°, preferably in an angular range of 146° to 156°. A first jet cone angle 17 is particularly advantageously approximately 150°. For the second jet cone angle 20, an angular range of 50° to 120° is preferred. In particular, the angular range may extend from 60° to 105°, or according to one particularly advantageous embodiment may extend from 60° to 90°.

In the embodiments shown here, the two opening planes 11, 13 are separated from one another by an axial distance in such a way that the second opening plane 13 is situated closer to an injector tip 23 facing the piston 4 than the first opening plane 11. For the case that a fresh air supply (not shown here) to the internal combustion engine 1 is configured in such a way it may act on the fresh air charge of the combustion chamber 3 with a swirl that rotates about the longitudinal central axis 6 of the cylinder 2, the injector 5 may be configured in such a way that the first injection openings 9 and the second injection openings 10 are situated one on top of the other along the longitudinal central axis 7 of the injector 5. The injection jets 15, 18, which enter into the combustion chamber 3 from the respective injection openings at different jet cone angles 17, 20, respectively, and thus undergo a deflection with different degrees of swirl in the direction of the swirl, are advantageously deflected with an offset relative to one another in the direction of the piston 4, so that [there is] essentially no contact between the injection jets 15, 18 from the respective injection openings 9, 10 in the opening planes 11, 13 which are separated from one another by an axial distance, which spread out in the combustion chamber 3, so that there is also little or no contact between the flame fronts 21, 22 which form from the injection jets 15, 18, respectively. Similarly, the injection openings 9, 10 in the opening planes 11, 13 which are separated from one another by an axial distance may be offset with respect to one another along the longitudinal central axis 7 of the injector 5 in a configuration without swirl or without significant swirl. In a configuration that is not illustrated, it is also conceivable to have the opening planes 11, 13 coincide without swirl, so that all injection openings 9, 10 are situated in a single opening plane, and the first injection openings 9 and the second injection openings 10 are arranged in alternation in the peripheral direction of the shared opening plane.

With increasing distance from the respective injection openings 9, 10, the respective injection jet 15, 18 exiting from its associated injection opening 9, 10 spreads out transversely with respect to its jet longitudinal central axis 24 for the respective first injection jet 15, or with respect to its jet longitudinal central axis 25 for the respective second injection jet 18. This spreading of the particular injection jet 15, 18 transversely with respect to its jet longitudinal axis 24, 25, respectively, is also referred to as jet disintegration. This jet disintegration on the one hand is a function of the injection pressure, and on the other hand is geometrically determined by the respective opening diameter and by the respective conicity of the particular injection opening 9, 10 and by a rounding of the particular injection opening 9, 10 on the input side and/or output side. The first injection openings 9 and the second injection openings 10 advantageously have designs that are geometrically different, such that the second injection openings 10 generate second injection jets 18 which have a second jet disintegration that is greater than a first jet disintegration possessed by the first injection jets 15, which are generated by means of the first injection openings 9. A larger jet disintegration means that the spreading of the fuel transversely with respect to the longitudinal central axis 24, 25 of the injection jet 15, 18, respectively, is more strongly pronounced. Consequently, according to FIG. 2 the respective first injection jet 15 has the shape of a comparatively long but thin lobe, while the second injection jet 18 has the shape of a comparatively short but thick lobe. The first injection jet 15 with its small first jet disintegration advantageously has a higher pulse than the second injection jet 18 with its higher second jet disintegration, so that the first injection jet 15 may still strike the piston as a jet lobe, and therefore the first injection jet 15 may be correspondingly deflected at the piston 4 and distributed in the combustion chamber 3.

According to FIG. 1, on its side 26 facing the combustion chamber 3 the piston 4 has a piston recess 27 which has a recess contour 28. For the first injection jets 18, this recess contour 28 may have a deflection geometry 29 which is shaped in such a way that it deflects the second injection jets 18 in the direction toward the first injection jets 15. A second injection jet 18 which is deflected in this way is indicated by an arrow 30 in FIG. 1. In the example, the recess contour 28 also has a jet splitter geometry 31 for the first injection jets

15 which is configured in such a way that it splits the respective first injection jet 15 into two partial jets. A first partial jet 32 and a second partial jet 33 are indicated by arrows in FIG. 1. The first partial jets 32 are deflected into an area 34 facing the second injection jets 18, while the second partial jets 33 are deflected into an area 35 facing away from the second injection jets 18. The one area 34 is situated with respect to the first jet cone 16 on an inner side facing the second injection jets 18, while the other area 35 is situated with respect to the first jet cone 16 on an outer side facing away from the second injection jets 18.

In the example in FIG. 1, the recess contour 28 includes a further deflection contour 36 which is designed in such a way that it deflects the first partial jets 32 in the direction toward the first injection jets 15. A first partial jet which is deflected in this way is indicated by an arrow 37 in FIG. 1.

It is apparent that the injection of the fuel advantageously takes place at a point in time when the piston 4 is in the area of its top dead center. The recess contour 28 is advantageously rotationally symmetrical with respect to the longitudinal central axis 6 of the cylinder 2.

The invention claimed is:

1. An internal combustion engine, with
   at least one cylinder (2) which encloses a combustion chamber (3) and in which a piston (4) is situated in such a way that it may perform a stroke movement,
   at least one injector (5) per cylinder (2) for injecting fuel into the combustion chamber (3), the respective injector (5) having a longitudinal central axis (7) and multiple injection openings (9, 10) through which the fuel exits from the injector (5) and enters into the combustion chamber (3) during an injection process,
   wherein the respective injector (5) has a first opening row (12) with multiple first injection openings (9) in a first opening plane (11) extending transversely with respect to the longitudinal central axis (7) of the injector, and a second opening row (14) with multiple second injection openings (10) in a second opening plane (13) extending transversely with respect to the longitudinal central axis (7) of the injector,
   wherein the first injection openings (9) and the second injection openings (10) are situated relative to one another in such a way that during an injection process, first injection jets (15) from the first injection openings (9) reach the piston (4) essentially without contacting second injection jets (18) from the second injection openings (10), and
   wherein the particular piston (4) has a piston recess (27), on its side (26) facing the respective combustion chamber (3), having a recess contour (28) which:
   for the first injection jets (15) has a jet splitter geometry (31) which splits the first injection jets (15) into first partial jets (32) and second partial jets (33), the first partial jets (32) being deflected into an area (34) facing the second injection jets (18), and the second partial jets (33) being deflected into an area (35) facing away from the second injection jets (18), and
   for the second injection jets (18) has a deflection geometry (29) which deflects the second injection jets (18) in the direction toward the first injection jets (15), and
   wherein the first injection openings (9) have a first jet disintegration which is smaller than a second jet disintegration of the second injection openings (10).

2. The internal combustion engine according to claim 1, wherein the longitudinal central axis (7) of the injector (5) is situated essentially coaxially with respect to a longitudinal central axis (6) of the cylinder (2).

3. The internal combustion engine according to claim 1, wherein at least one of:
   the first opening row (12) has 6 to 12 first injection openings (9),
   the second opening row (14) has 3 to 6 second injection openings (10),
   the first injection openings (9) generate a first jet cone (16) whose first jet cone angle (17) is larger than a second jet cone angle (20) of a second jet cone (19) that is generated by means of the second injection openings (10),
   the first injection openings (9) generate a first jet cone angle (17) of 142° to 160°, and
   the second injection openings (10) generate a second jet cone angle (20) of 50° to 120°.

4. The internal combustion engine according to claim 1, wherein the first and second opening planes (11, 13) are separated from one another by an axial distance, the second opening plane (13) being situated closer to an injector tip (23) facing the piston (4) than the first opening plane (11).

5. The internal combustion engine according to claim 1, wherein
   a fresh air supply to the internal combustion engine (1) for the respective cylinder (2) is configured in such a way that the fresh air charge of the combustion chamber (3) is acted on by a swirl, and
   the first injection openings (9) and the second injection openings (10) in the two opening planes (11, 13) are situated one on top of the other along the longitudinal central axis (7) of the injector (5).

6. The internal combustion engine according to claim 1, wherein the recess contour (28) has a further deflection contour (36) which deflects the first partial jets (32) in the direction toward the first injection jets (15).

7. The internal combustion engine according to claim 1, wherein the internal combustion engine is mounted in a motor vehicle.

8. The internal combustion engine according to claim 1, wherein at least one of:
   the first opening row (12) has 8 to 10 first injection openings (9),
   the second opening row (14) has 4 to 5 second injection openings (10),
   the first injection openings (9) generate a first jet cone (16) whose first jet cone angle (17) is at least 50% larger than a second jet cone angle (20) of a second jet cone (19) that is generated by means of the second injection openings (10),
   the first injection openings (9) generate a first jet cone angle (17) of 146° to 156°, and
   the second injection openings (10) generate a second jet cone angle (20) of 60° to 105°.

9. The internal combustion engine according to claim 1, wherein at least one of
   the first injection openings (9) generate a first jet cone angle (17) of approximately 150°, and
   the second injection openings (10) generate a second jet cone angle (20) of 60° to 90°.

10. A method for operating a direct-injection, auto-igniting internal combustion engine (1) according to claim 1, comprising:
    directing first injection jets (15) to penetrate into the respective combustion chamber (3) in the direction of the piston (4) to generate a first flame front (21) in the combustion chamber (3), and simultaneously with the first injection jets (15), directing second injection jets (18) to penetrate into the respective combustion chamber (3) and generate a second flame front (22) in the combustion chamber (3), wherein the first injection jets (15) and the second injection jets (18) reach the piston (4) essentially without contact.

\* \* \* \* \*